US012586477B2

(12) United States Patent
Büddefeld et al.

(10) Patent No.: US 12,586,477 B2
(45) Date of Patent: Mar. 24, 2026

(54) FLIGHT PLANNING BASED ON SOCIETAL IMPACT CONSIDERATIONS

(71) Applicant: THE BOEING COMPANY, Chicago, IL (US)

(72) Inventors: Michael Christian Büddefeld, Neu-Isenburg (DE); Hugo Eduardo Teomitzi, Darmstadt (DE); Anna-Lisa Mautes, Darmstadt (DE)

(73) Assignee: THE BOEING COMPANY, Arlington, VA (US)

( * ) Notice: Subject to any disclaimer, the term of this patent is extended or adjusted under 35 U.S.C. 154(b) by 100 days.

(21) Appl. No.: 18/069,672

(22) Filed: Dec. 21, 2022

(65) Prior Publication Data

US 2024/0212512 A1 Jun. 27, 2024

(51) Int. Cl.

| | |
|---|---|
| ***G08G 5/55*** | (2025.01) |
| ***G08G 5/22*** | (2025.01) |
| ***G08G 5/32*** | (2025.01) |
| ***G08G 5/34*** | (2025.01) |
| ***G08G 5/56*** | (2025.01) |
| ***G08G 5/59*** | (2025.01) |
| ***G08G 5/72*** | (2025.01) |

(52) U.S. Cl.

CPC ................. *G08G 5/55* (2025.01); *G08G 5/22* (2025.01); *G08G 5/32* (2025.01); *G08G 5/34* (2025.01); *G08G 5/56* (2025.01); *G08G 5/59* (2025.01); *G08G 5/727* (2025.01)

(58) Field of Classification Search

CPC .... G08G 5/006; G08G 5/0026; G08G 5/0034; G08G 5/0039; G08G 5/0043; G08G 5/0082

See application file for complete search history.

(56) References Cited

U.S. PATENT DOCUMENTS

| | | | | |
|---|---|---|---|---|
| 7,702,427 | B1 * | 4/2010 | Sridhar | G08G 5/80 701/16 |
| 9,786,187 | B1 * | 10/2017 | Bar-Zeev | G06Q 10/08355 |
| 10,032,383 | B2 * | 7/2018 | Valls Herná | G01C 21/20 |
| 10,354,538 | B2 * | 7/2019 | Kusuma | G08G 5/0034 |
| 10,933,977 | B2 * | 3/2021 | Gartenberg | B64D 35/022 |
| 10,977,951 | B2 * | 4/2021 | Kubie | G01C 21/005 |
| 10,997,865 | B2 * | 5/2021 | Boozarjomehri | G08G 5/0034 |
| 11,157,867 | B1 * | 10/2021 | Jordan | G01C 21/005 |

(Continued)

FOREIGN PATENT DOCUMENTS

EP 3701343 B1 9/2020

OTHER PUBLICATIONS

Extended European Search Report for application No. 23215704.0 dated Jun. 6, 2024, pp. 1-9.

(Continued)

*Primary Examiner* — Fadey S. Jabr

*Assistant Examiner* — Mark Robert Heim

(74) *Attorney, Agent, or Firm* — Moore IP Law

(57) ABSTRACT

A method includes obtaining, at a device, source and destination data for one or more upcoming flights through a particular airspace. The method also includes obtaining, at the device, a map of societal impact hotspots associated with traffic through the particular airspace, and generating, based on the map of societal impact hotspots, a set of trajectories for the one or more upcoming flights through the particular airspace.

20 Claims, 6 Drawing Sheets

(56) References Cited

U.S. PATENT DOCUMENTS

| | | | | |
|---|---|---|---|---|
| 11,262,746 | B1 * | 3/2022 | Van Duren | B64U 20/80 |
| 11,403,957 | B2 * | 8/2022 | Beaurepaire | G01C 23/00 |
| 11,514,798 | B2 * | 11/2022 | Gonzalez | G08G 5/0034 |
| 11,605,303 | B2 * | 3/2023 | Venkataramana | G08G 5/21 |
| 11,618,551 | B2 * | 4/2023 | Hutchinson | B64C 11/30 701/4 |
| 11,688,286 | B1 * | 6/2023 | Timar | G08G 5/0013 701/120 |
| 11,927,971 | B2 * | 3/2024 | Sakurada | G05D 1/228 |
| 2010/0017114 | A1 * | 1/2010 | Tehan | G01C 21/20 701/423 |
| 2012/0191333 | A1 * | 7/2012 | Sawhill | G08G 5/53 701/122 |
| 2012/0296499 | A1 * | 11/2012 | Kirchhofer | G05D 1/102 701/3 |
| 2016/0117931 | A1 * | 4/2016 | Chan | G08G 5/56 701/120 |
| 2016/0275801 | A1 * | 9/2016 | Kopardekar | G08G 5/0082 |
| 2017/0059343 | A1 * | 3/2017 | Spinelli | G01C 21/20 |
| 2017/0132942 | A1 * | 5/2017 | Mere | G01C 23/00 |
| 2018/0090014 | A1 * | 3/2018 | Kline | G06Q 10/083 |
| 2019/0147748 | A1 * | 5/2019 | Boozarjomehri | G08G 5/0039 701/120 |
| 2019/0266902 | A1 * | 8/2019 | Molnar | G08G 5/0073 |
| 2019/0332916 | A1 * | 10/2019 | Anderson | H03G 3/32 |
| 2019/0340934 | A1 * | 11/2019 | Villa | G08G 5/003 |
| 2019/0340937 | A1 * | 11/2019 | Villa | G05D 1/0202 |
| 2020/0166895 | A1 * | 5/2020 | Ferreira | G06N 5/02 |
| 2020/0388166 | A1 * | 12/2020 | Rostamzadeh | G06N 7/01 |
| 2021/0012669 | A1 * | 1/2021 | Beaurepaire | G08G 5/21 |
| 2021/0043092 | A1 * | 2/2021 | Tillotson | G08G 5/0034 |
| 2021/0142776 | A1 * | 5/2021 | Sadhwani | G06V 10/454 |
| 2021/0374627 | A1 * | 12/2021 | Mueller | G06Q 10/06312 |
| 2022/0051577 | A1 * | 2/2022 | Ali | G08G 5/56 |
| 2022/0052839 | A1 * | 2/2022 | Ali | G08G 5/26 |
| 2022/0057214 | A1 * | 2/2022 | O'Dell | G08G 5/0039 |
| 2022/0292989 | A1 | 9/2022 | Tillotson et al. | |
| 2022/0335841 | A1 * | 10/2022 | Huncha | G08G 5/76 |
| 2022/0397917 | A1 * | 12/2022 | Arksey | G06N 20/00 |
| 2024/0371276 | A1 * | 11/2024 | Bosson | G08G 5/26 |
| 2024/0371279 | A1 * | 11/2024 | Bosson | G08G 5/54 |

OTHER PUBLICATIONS

"Position Paper on Dose Response Relationships Between Transportation Noise and Annoyance," EU's Future Noise Policy, WG2—Dose/Effect, European Communities, Feb. 20, 2022, pp. 1-40.

"Study on the societal acceptance of Urban Air Mobility in Europe," European Union Aviation Safety Agency, May 19, 2021, pp. 1-162.

Communication pursuant to Article 94(3) EPC for application No. 23215704.0 dated Dec. 15, 2025.

* cited by examiner

550

| Lden | %A | %HA |
|---|---|---|
| 45 | 11 | 1 |
| 50 | 19 | 5 |
| 55 | 28 | 10 |
| 60 | 38 | 17 |
| 65 | 48 | 26 |
| 70 | 60 | 37 |
| 75 | 73 | 49 |

FLIGHT PLANNING BASED ON SOCIETAL IMPACT CONSIDERATIONS

FIELD OF THE DISCLOSURE

The present disclosure is generally related to planning aircraft flights.

BACKGROUND

Social acceptance of low-level air operation is important for widespread adoption of urban air mobility (UAM) and advanced air mobility (AAM). Urban air mobility encompasses an aviation transportation system that can use highly automated aircraft that operate and transport passengers or cargo at lower altitudes within urban and suburban areas. Advanced air mobility builds upon the UAM concept by incorporating use cases not specific to operations in urban environments, such as commercial inter-city (longer range/thin haul), cargo delivery public services, and private or recreational vehicles.

However, several studies and surveys (e.g., from the European Union Aviation Safety Agency (EASA)) have identified noise and privacy issues as the major reservations expressed by the public about future urban air mobility. Because UAM and AAM tend to operate in populated areas using a low flying altitude, a societal impact of such flights is to be expected. Without additional effort to reduce this impact, public acceptance of such flights may be less than optimal.

However, conventional flight routing systems do not take into account societal impacts such as noise and privacy issues to reduce or minimize such impacts, especially when considering the aggregated effects of all local flight traffic in and around densely populated areas over relatively long time periods, such as several hours, an entire day, or even longer. As a result, the use of conventional flight routing systems can result in "hotspots" in which a relatively large amount of aircraft are routed through a particular section of airspace over a relatively short time period, resulting in disproportionate societal impact to nearby populations, negatively impacting the affected population and hindering societal acceptance of such urban aircraft operation.

SUMMARY

In a particular implementation, a method includes obtaining, at a device, source and destination data for one or more upcoming flights through a particular airspace. The method includes obtaining, at the device, a map of societal impact hotspots associated with traffic through the particular airspace. The method also includes generating, based on the map of societal impact hotspots, a set of trajectories for the one or more upcoming flights through the particular airspace.

In another particular implementation, a device includes one or more processors configured to obtain source and destination data for one or more upcoming flights through a particular airspace. The one or more processors are configured to obtain a map of societal impact hotspots associated with traffic through the particular airspace. The one or more processors are also configured to generate, based on the map of societal impact hotspots, a set of trajectories for the one or more upcoming flights through the particular airspace.

In another particular implementation, a non-transitory computer-readable medium includes instructions that, when executed by one or more processors, cause the one or more processors to obtain source and destination data for one or more upcoming flights through a particular airspace. The instructions, when executed by the one or more processors, cause the one or more processors to obtain a map of societal impact hotspots associated with traffic through the particular airspace. The instructions, when executed by the one or more processors, also cause the one or more processors to generate, based on the map of societal impact hotspots, a set of trajectories for the one or more upcoming flights through the particular airspace.

The features, functions, and advantages described herein can be achieved independently in various implementations or may be combined in yet other implementations, further details of which can be found with reference to the following description and drawings.

DETAILED DESCRIPTION

Figure 1:
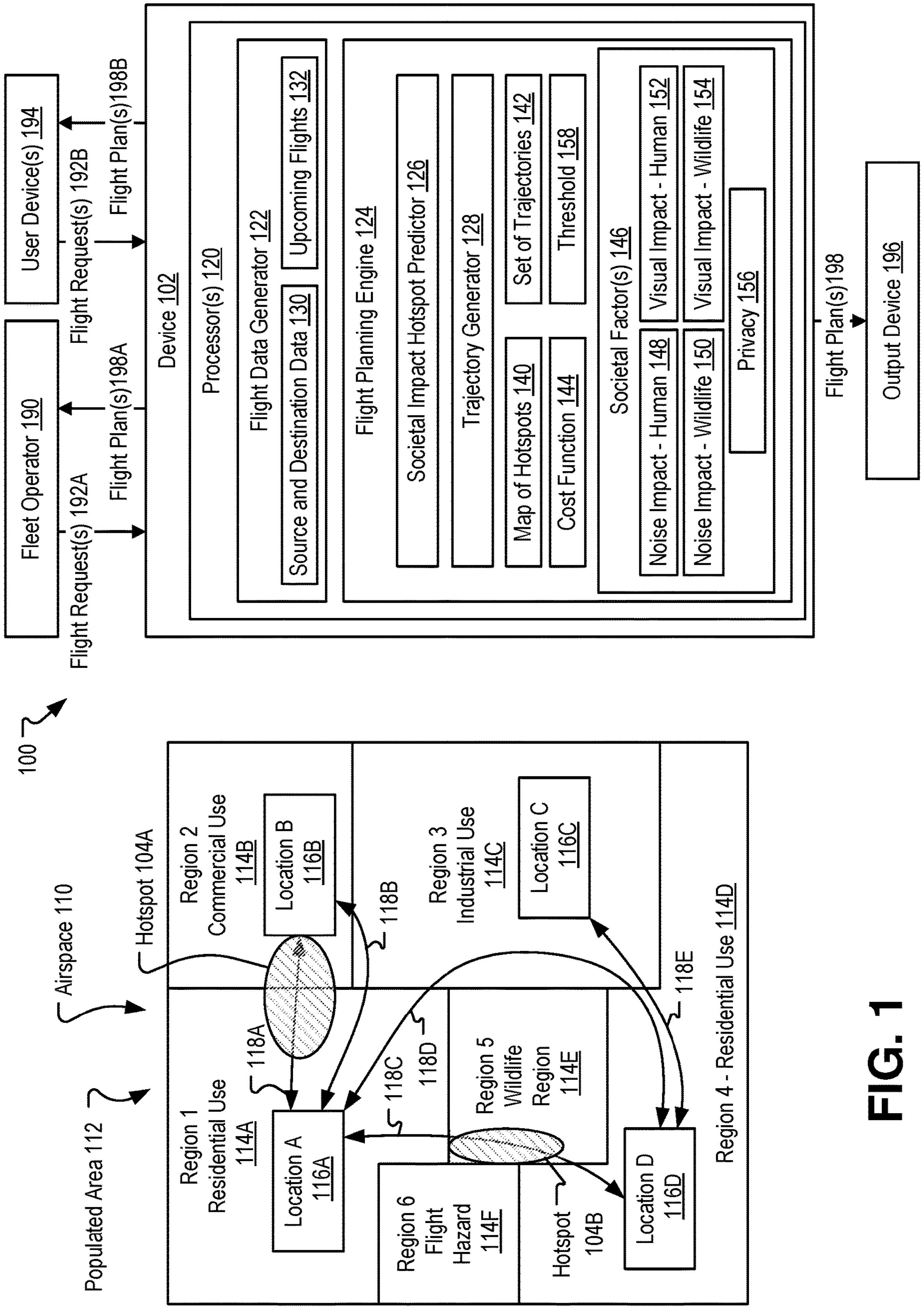
FIG. 1 is a diagram that illustrates a system configured to perform flight planning based on societal impact considerations.

Aspects disclosed herein present systems and methods for flight planning based on societal impact considerations. Social acceptance of low-level air operation may be necessary to ensure the success of urban air mobility as a viable business. Issues associated with low-level flight, such as noise and privacy concerns, can have a negative societal impact and therefore can negatively affect local populations and hinder social acceptance of urban air mobility.

The disclosed systems and methods enable consideration of societal impacts, and particularly emerging hotspots, in the strategical planning phase of UAM trajectories. By implementing a feedback loop based on traffic demand simulations, societal impact can be reduced or minimized, and emergence of hotspots can be predicted and avoided. Such traffic planning leverages various aspects, such as land use data and dynamic population densities, for enhanced accuracy of flight demand predictions.

According to an aspect, a demand forecast model enables determination of wide-scale potential UAM operations in an airspace over long timeframes based on several factors, such as land use, timescale, and dynamic population densities. Based on this information, the disclosed systems and methods generate representations of routes based on obstacles, risk maps, weather, and other aeronautical information. This holistic set of trajectories is then used to compute local hotspots based on societal impact. A transformation of this data into a cost map enables iterative re-computation of individual flights of interest, or of the entire flight traffic scenario, in order to minimize the impact created by the accumulation of flying vehicles.

According to an aspect, the proposed systems and methods enable trajectory planning based on iteratively optimizing routes using societal impact information, such as dynamic population density, land use, sheltering/protection indexes, and vehicle-specific performance and sound characteristics. This societal impact of the selected routes can then be provided as feedback for a next iteration of trajectory planning. As a result, a societal impact of overall air traffic can be reduced or minimized, as well as preventing local hotspots that may otherwise arise from use of conventional flight planning that ignores societal impact. Reducing the societal impact of low-level flights encourages public acceptance of UAM operations, enabling UAM systems to improve aspects for the affected population such as by reducing road traffic, enhancing delivery speed, etc. In addition, predicting and accounting for societal impacts of low-level flights and hotspots at the trajectory planning stage enables quicker and more efficient performance of a flight planning system in achieving an acceptable traffic scenario as compared to conventional systems in which trajectory planning results in traffic scenarios that cause negative real-world societal effects, and which have to be adjusted later as hotspots caused by low-flying air traffic are reported by the affected public.

The figures and the following description illustrate specific exemplary embodiments. It will be appreciated that those skilled in the art will be able to devise various arrangements that, although not explicitly described or shown herein, embody the principles described herein and are included within the scope of the claims that follow this description. Furthermore, any examples described herein are intended to aid in understanding the principles of the disclosure and are to be construed as being without limitation. As a result, this disclosure is not limited to the specific embodiments or examples described below, but by the claims and their equivalents.

Particular implementations are described herein with reference to the drawings. In the description, common features are designated by common reference numbers throughout the drawings. In some drawings, multiple instances of a particular type of feature are used. Although these features are physically and/or logically distinct, the same reference number is used for each, and the different instances are distinguished by addition of a letter to the reference number. When the features as a group or a type are referred to herein (e.g., when no particular one of the features is being referenced), the reference number is used without a distinguishing letter. However, when one particular feature of multiple features of the same type is referred to herein, the reference number is used with the distinguishing letter. For example, referring to FIG. 1, multiple regions are illustrated and associated with reference numbers 114A, 114B, 114C, etc. When referring to a particular one of these regions, such as the region 114A, the distinguishing letter "A" is used. However, when referring to any arbitrary one of these regions or to these regions as a group, the reference number 114 is used without a distinguishing letter.

As used herein, various terminology is used for the purpose of describing particular implementations only and is not intended to be limiting. For example, the singular forms "a," "an," and "the" are intended to include the plural forms as well, unless the context clearly indicates otherwise. Further, some features described herein are singular in some implementations and plural in other implementations. To illustrate, FIG. 1 depicts a device 102 including one or more processors ("processor(s)" 120 in FIG. 1), which indicates that in some implementations the device 102 includes a single processor 120 and in other implementations the device 102 includes multiple processors 120. For ease of reference herein, such features are generally introduced as "one or more" features, and are subsequently referred to in the singular or optional plural (e.g., "processor(s)") unless aspects related to multiple of the features are being described.

The terms "comprise," "comprises," and "comprising" are used interchangeably with "include," "includes," or "including." Additionally, the term "wherein" is used interchangeably with the term "where." As used herein, "exemplary" indicates an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to a grouping of one or more elements, and the term "plurality" refers to multiple elements.

As used herein, "generating," "calculating," "using," "selecting," "accessing," and "determining" are interchangeable unless context indicates otherwise. For example, "generating," "calculating," or "determining" a parameter (or a signal) can refer to actively generating, calculating, or determining the parameter (or the signal) or can refer to using, selecting, or accessing the parameter (or signal) that is already generated, such as by another component or device. As used herein, "coupled" can include "communicatively coupled," "electrically coupled," or "physically coupled," and can also (or alternatively) include any combinations thereof. Two devices (or components) can be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled can be included in the same device or in different devices and can be connected via electronics, one or more connectors, or inductive coupling, as illustrative, non-limiting examples. In some implementations, two devices (or components) that are communicatively coupled, such as in electrical communication, can send and receive electrical signals (digital signals or analog signals) directly or indirectly, such as via one or more wires, buses, networks, etc. As used herein, "directly coupled" is used to describe two devices that are coupled (e.g., communicatively coupled, electrically coupled, or physically coupled) without intervening components.

Referring to FIG. 1, a system 100 illustrates an implementation of a device 102 that is operable to perform flight planning based on societal impact consideration. An airspace 110 over a populated area 112 is also illustrated to graphically depict examples of flight planning to reduce or eliminate societal impact hotspots, as described further below.

The device 102 includes one or more processors 120 and is communicatively coupled to other components of the system 100 including a fleet operator system 190, one or more user devices 194, and an output device 196. The device 102 is configured to generate planned flight trajectories for a set of flights through the airspace 110 at least partially based on one or more societal factors 146. The one or more processors 120 can be implemented as a single processor or as multiple processors, such as in a multi-core configuration, a multi-processor configuration, a distributed computing configuration, a cloud computing configuration, or any combination thereof.

The one or more processors 120 include a flight data generator 122 and a flight planning engine 124. The flight planning engine 124 includes a societal impact hotspot predictor 126 and a trajectory generator 128. In some implementations, one or more portions of the flight data generator 122, the flight planning engine 124, the societal impact hotspot predictor 126, the trajectory generator 128, or a combination thereof, are implemented by the one or more processors 120 using dedicated hardware, firmware, or a combination thereof. In some implementations, one or more portions of the flight data generator 122, the flight planning engine 124, the societal impact hotspot predictor 126, the trajectory generator 128, or a combination thereof, can be implemented at least in part by the one or more processors 120 executing instructions.

The one or more processors 120 are configured to obtain source and destination data 130 for one or more upcoming flights 132 through a particular airspace, such as the airspace 110 over the populated area 112. For example, the flight data generator 122 is configured to obtain the source and destination data 130 for the one or more upcoming flights 132 via flight requests 192 for the airspace 110, predicted flight demand for the airspace 110 (as described further with reference to FIG. 2), or a combination thereof.

To illustrate, the device 102 can receive one or more flight requests 192A from the fleet operator system 190. For example, the fleet operator system 190 may control multiple aircraft, such as an urban air mobility provider that provides highly automated aircraft for passenger and/or cargo transport. In some implementations, the fleet operator system 190 corresponds to or includes one or more fleet operators and the device 102 functions as a central route planning service. The one or more flight requests 192A can correspond to scheduled future flights and can each include a starting location, an ending location, a start time, and other data or criteria such as an upper limit for flight duration, an altitude ceiling, a type of aircraft, one or more waypoints between the starting location and the ending location, etc.

Similarly, the device 102 can receive one or more flight requests 192B from the one or more user devices 194. For example, each of the user devices 194 can correspond to a personal electronic device (e.g., a smartphone) of a recreational or commercial drone operator. The one or more flight request 192B can include similar information as described for the flight request(s) 192A from the fleet operator system 190 and generally tend to correspond to requests for more immediate flights associated with a larger variety of starting and ending locations as compared to the more regular scheduled flights associated with fleet operations.

The one or more processors 120 are configured to obtain a map of societal impact hotspots 140 associated with traffic through the particular airspace 110 and generate, based on the map of societal impact hotspots 140, a set of trajectories 142 for the one or more upcoming flights 132 through the airspace 110. To illustrate, the flight planning engine 124 is configured to process the source and destination data 130 at the trajectory generator 128 to determine the set of trajectories 142. According to some examples, the trajectory generator 128 can evaluate, for each particular flight of the upcoming flights 132, multiple potential trajectories from the source to the destination for that flight and select the trajectory that is calculated to have a least cost of the multiple evaluated potential trajectories for that particular flight. As used herein, the "cost" of a trajectory can be determined based on traditional factors such as energy usage, efficiency, and safety/risk, as well as societal impact factors such as noise impacts, visual impacts, and privacy impacts. As such, the cost of a trajectory is not necessarily determined as a monetary amount and instead can be determined via any metric that measures an overall impact of the trajectory as a basis for comparison to other trajectories.

The flight planning engine 124 determines the set of trajectories 142 for the upcoming flights 132 based on a cost function 144. To illustrate, the flight planning engine 124 models the airspace 110 as a three-dimensional grid (e.g., a regular grid or an irregular grid) of 3-dimensional (3D) volumes of the airspace 110 and can assign a cost to each of the airspace volumes based on evaluating the cost function 144 for that airspace volume based on factors such as risk, energy, efficiency, one or more of the societal factors 146, or a combination thereof, for that aircraft volume. The trajectory generator 128 determines the cost of a particular trajectory based on combining (e.g., summing) the cost for each particular volume of the airspace 110 that the particular trajectory passes through. The cost function 144 is at least partially based on one or more of the societal factors 146. As illustrated, the one or more societal factors 146 include a first noise impact 148 on an overflown human population, a first visual impact 152 on the overflown human population, a second noise impact 150 on an overflown wildlife population, a second visual impact 154 on the overflown wildlife population, and a privacy impact 156. In some examples, one or more aspects of the cost function 144 associated with a visual impact, a noise impact, or both, are at least partially determined based on a time of day associated with at least one of the upcoming flights 132. As an illustrative, non-limiting example, the noise impact of an aircraft in a residential area can be associated with a lower cost during the daytime and a higher cost at night. As another example, the noise impact in a commercial area (e.g., an office district) can be associated with a higher cost during the daytime when office workers are present and a lower cost at night when most occupants have returned to their homes. In some examples, one or more aspects of the cost function 144 associated with a privacy impact is at least partially determined based on a time of day associated with at least one of the upcoming flights 132.

The societal impact hotspot predictor 126 is configured to determine locations of the populated area 112 in which air traffic is predicted to result in a high societal impact, referred to herein as "societal impact hotspots" or "hotspots." In some implementations, the societal impact hotspot predictor 126 models the populated area 112 as a grid of surface locations (also referred to herein as "land areas") and processes the set of trajectories 142, predicts a cumulative societal impact, on each of the surface locations, of all aircraft traffic flying over that surface location over a time period under evaluation, and compares the cumulative societal impact for each surface location to one or more thresholds 158 to identify societal impact hotspots. In some examples, the one or more thresholds 158 can include a separate threshold for each of the first noise impact 148, the second noise impact 150, the first visual impact 152, the second visual impact 154, and the privacy impact 156. In other examples, two or more (or all) of the first noise impact 148, the second noise impact 150, the first visual impact 152, the second visual impact 154, and the privacy impact 156 can be combined and compared to a single threshold of the one or more thresholds 158. In some implementations, the thresholds can vary depending on the time of day, the day of the week, or due to particular scheduled events such as religious observances or holidays. For example, a noise threshold for a residential location may be higher during daytime hours than during nighttime hours (e.g., due to a higher proportion of the residential population being away from home during work hours, a higher sensitivity to noise during sleeping hours, as illustrative, non-limiting examples).

In some implementations, the flight planning engine 124 is configured to iteratively update hotspot data (e.g., in the map of hotspots 140) and determine new sets of trajectories to reduce a prevalence, a severity, or both, of societal impact hotspots. In an example, each of the societal impact hotspots associated with a particular set of trajectories indicates that total impact on an affected surface location, due to one or more of the societal factors 146, has exceeded a threshold 158. Data indicating the presence of each of the societal impact hotspots is input into the cost function 144 to increase the cost associated with relevant volume(s) of the airspace 110 when generating an updated set of trajectories. A particular implementation of iterative hotspot analysis and trajectory determination is described with reference to FIG. 2.

During operation, the system 100 processes the flight requests 192 to determine the trajectories 142 through the populated area 112 based on societal impact considerations. The populated area 112 includes multiple regions 114 that are zoned or otherwise categorized as having differing uses. For example, a first region 114A is categorized as residential use (e.g., single-unit or multi-unit housing), a second region 114B is categorized as commercial use (e.g., shopping areas, offices, etc.), and a third region 114C is categorized as industrial use (e.g., factories, utilities, workshops, etc.). A fourth region 114D is categorized as residential use, a fifth region 114E is categorized as a wildlife region (e.g., undeveloped land containing wildlife), and a sixth region 114F is categorized as a flight hazard region (e.g., a region including natural flight hazards such as mountains, tall trees, areas of high wind, etc., artificial flight hazards such as wind farms, skyscrapers, power lines, etc., or a combination thereof).

Various locations 116 are illustrated in the populated area 112, and potential flight paths 118 between the locations 116 are graphically depicted as arrowed lines. Although illustrated as two-dimensional lines representing aircraft travel through the airspace 110 between locations, it should be understood that the flight paths 118 can also include altitude information that can vary along the respective paths.

The first region 114A includes a first location (location A) 116A that serves as a source or destination for illustrative flight paths 118A-118D, the second region 114B includes a second location (location B) 116B that serves as a source or destination for flight paths 118A and 118B, the third region 114C includes a third location (location C) 116C that serves as a source or destination for an illustrative flight path 118E, and the fourth region 114D includes a fourth location (location D) 116D that serves as a source or destination for flight paths 118C-118E. For simplicity of explanation, each of the locations 116 corresponds to an urban airport or other dedicated location for UAM flights. However, it should be understood that, in general, air traffic may originate and terminate at virtually any location within the populated area 112 (e.g., food delivery or package delivery drones, personal commuter aircraft, etc.).

In a first example, the device 102 receives a relatively large number of flight requests 192 for travel between the first location 116A and the second location 116B. The most direct route between the first location 116A and the second location 116B corresponds to the flight path 118A, which would be chosen by a conventional flight trajectory planning system due to being the trajectory having the lowest energy usage and efficiency costs. However, assigning a large number of flights along the lowest cost flight path 118A results in a large societal impact due to the large number of aircraft flying along the same path. For example, the societal impact hotspot predictor 126 may determine that a hotspot 104A is predicted along the flight path 118A due to the first noise impact 148 (e.g., noise from the aircraft passing overhead), the first visual impact 152 (e.g., the sight of multiple aircraft passing overhead), and the privacy impact 156 on overflown residents and businesses, the accumulation of which causes the predicted societal impact of the flights to exceed the threshold 158.

The societal impact hotspot predictor 126 adds the hotspot 104A to the map of hotspots 140. In response to the hotspot 104A, the trajectory generator 128 updates the cost function 144 and re-calculates the costs associated with volumes of the airspace associated with the hotspot 104A. Using the recalculated costs, the trajectory generator 128 generates an updated set of trajectories in which a portion of the flights previously routed along the flight path 118A are instead routed along the flight path 118B. Although the flight path 118B is a less direct route and thus has a higher energy and efficiency cost as compared to the flight path 118A, the flight path 118B has a lower social impact cost that, for at least some aircraft, causes the overall cost for the flight path 118B to be lower than the updated cost for the flight path 118A. The lower social impact cost for the flight path 118B results from avoiding the hotspot 104A and also from traveling over industrial use land areas of the third region 114C, which may have lower social impact as compared to the commercial use land areas of the second region 114B. Reducing the number of aircraft using the flight path 118A reduces the severity of the hotspot 104A, as determined by the societal impact hotspot predictor 126. One or more additional iterations of updating the set of trajectories based on the map of hotspots 140, and updating the map of hotspots 140 based on the updated set trajectories, can be performed until the predicted hotspot 104A has been eliminated.

In a second example, the flight path 118C may be selected as the lowest cost flight between the first location 116A and the fourth location 116D because, although the flight path 118C is not the most direct route, it avoids the higher risk associated with travel through the sixth region 114F. However, as the number of flights between the first location 116A and the fourth location 116D increases over time (e.g., due to population growth in the fourth region 114D), the societal impact hotspot predictor 126 predicts that a hotspot 104B arises due to the second noise impact 150 (e.g., noise from the aircraft passing overhead) and the second visual impact 154 (e.g., the sight of multiple aircraft passing overhead) on overflown wildlife, the accumulation of which causes the predicted accumulated societal impact of the flights along the flight path 118C to exceed the threshold 158.

In a similar manner as described for the hotspot 104A, the societal impact hotspot predictor 126 adds the hotspot 104B to the map of hotspots 140, causing the trajectory generator 128 to update the cost function 144 and recalculate the costs associated with volumes of the airspace associated with the hotspot 104B. Using the recalculated costs, the trajectory generator 128 generates an updated set of trajectories in which a portion of the flights previously routed along the flight path 118C are instead routed along the flight path 118D. Although the flight path 118D is a less direct route, the flight path 118D has a lower social impact cost due to avoiding the hotspot 104B and due to traveling over industrial use land areas of the third region 114C. Reducing the number of aircraft using the flight path 118C reduces the severity of the hotspot 104B, as determined by the societal impact hotspot predictor 126. One or more additional iterations of updating the set of trajectories based on the map of hotspots 140, and updating the map of hotspots 140 based on the updated set trajectories, can be performed until the predicted hotspot 104B has been eliminated.

In some circumstances, rerouting traffic to reduce hotspots may create unexpected issues that are predicted and resolved by the device 102 during flight planning. For example, increasing the air traffic along the flight path 118B to eliminate the hotspot 104A and increasing the air traffic along the flight path 118D to eliminate the hotspot 104B may cause a third hotspot (not illustrated) to be predicted where the flight paths 118B and 118D converge near the first location 116A. As a result, the flight planning engine 124 can continue the process of updating costs associated with the new hotspot and rerouting flights based on the updated costs, until no hotspots remain predicted in the map of hotspots 140 (or until another termination criterion is met, such as when a number of iterations that have performed reaches an iteration threshold).

In response to determining that a computed set of trajectories results in no hotspots (or that another termination criterion has been met), the device 102 can provide one or more flight plans 198A to the fleet operator system 190 indicating the trajectories corresponding to the one or more flight requests 192A. Similarly, the device 102 can provide one or more flight plans 198B to the one or more user devices 194 indicating the trajectories corresponding to the one or more flight requests 192B. In some implementations, the device 102 outputs the one or more flight plans 198 to the output device 196, such as a display device for use by an air traffic manager or other official or supervisor associated with air traffic through the airspace 110.

By predicting hotspots due to the one or more societal factors 146 and adjusting trajectories to reduce the impact of societal costs, the device 102 enables more efficient generation of a set of trajectories with minimal societal impact on local populations and that avoid social impact hotspots, as compared to conventional techniques in which unacceptable societal impact is not detected until after the flights have been performed and overflown populations have been affected, and in response to which flight re-routing is performed in an ad hoc, trial-and-error manner.

Although described in the context of urban flight operations (e.g., UAM/AAM), it should be understood that the present techniques are not limited to urban flight operations and may instead, or additionally, be used for any other type of aviation application. Although the device 102 is described as including the flight data generator 122, the flight planning engine 124, the societal impact hotspot predictor 126, and the trajectory generator 128, it should be understood that in other implementations the functionality associated with one or more of the flight data generator 122, the flight planning engine 124, the societal impact hotspot predictor 126, or the trajectory generator 128 may be performed at one or more other devices coupled to the device 102, such as via a wireless network, a wired network, or any combination thereof.

Figure 2:
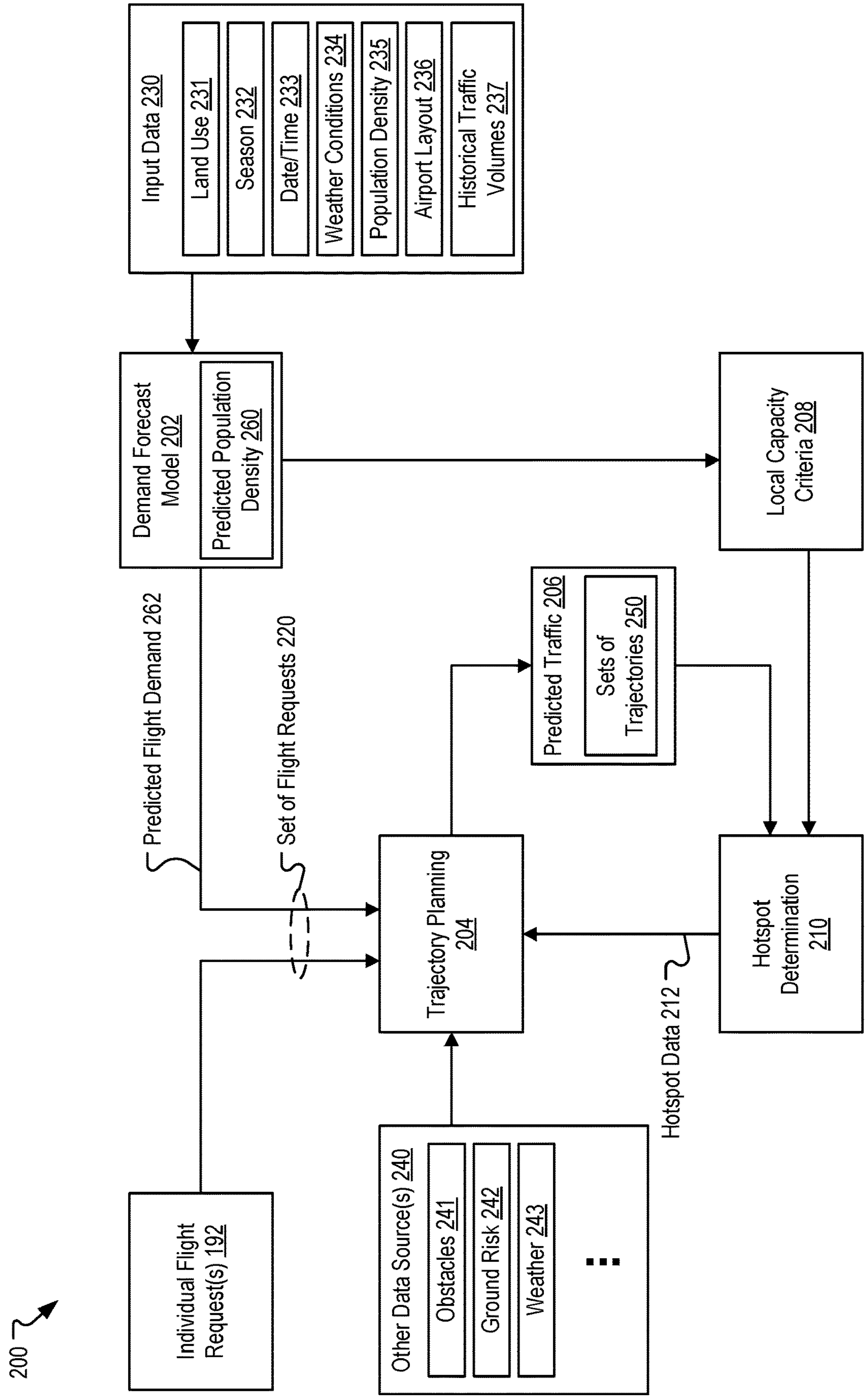
FIG. 2 is a diagram of a particular implementation of operations performed by the system of FIG. 1.

FIG. 2 illustrates operations 200 that may be performed by the device 102 according to a particular example. The operations 200 include obtaining a predicted flight demand 262 for a particular airspace, such as the airspace 110 of FIG. 1, in addition to (or instead of) obtaining one or more of the individual flight requests 192.

The predicted flight demand 262 is generated by a demand forecast model 202 that is configured to predict flight demand based on input data 230. In some implementations, the demand forecast model 202 is implemented by the flight data generator 122 of FIG. 1. Alternatively, the demand forecast model 202 may be implemented by one or more other devices and the predicted flight demand 262 is transmitted to the device 102.

In the example of FIG. 2, the input data 230 includes data associated with land use 231 (e.g., designating particular regions as residential, commercial, industrial, etc.), a season 232 (e.g., to adjust for seasonal variation in air traffic), date/time information 233, weather conditions 234, population density 235 (which may be time-varying, such as a population density that is lower in residential areas during weekday workhours than during nighttime hours), an airport layout 236, and historical traffic volumes 237. In other examples, the input data 230 can include fewer sets of data or one or more other types of data in place of, or in addition to, the illustrated data. The demand forecast model 202 is configured to determine, based on the input data 230, a predicted population density 260 for populated regions associated with the airspace 110, and to determine the predicted flight demand 262 (e.g., including source and destination data for predicted upcoming flights) at least partially based on the predicted population density 260. The predicted flight demand 262 can be represented as a collection of flight requests for predicted upcoming flights and merged with the one or more flight requests 192 to form a set of flight requests 220 that represent requested and/or predicted upcoming flights (e.g., the upcoming flights 132) and that are input to a trajectory planning operation 204.

Based on the set of flight requests 220, an iterative sequence of operations is performed that includes performing the trajectory planning operation 204 to determine a first set of trajectories 250 (e.g., the set of trajectories 142 of FIG. 1), followed by performing hotspot determination 210 to analyze predicted traffic 206 resulting from the first set of trajectories 250 to generate hotspot data 212. The hotspot data 212 is input to the trajectory planning operation 204 for a next iteration of the sequence. During the next iteration, the trajectory planning operation 204 updates the cost function 144 of FIG. 1 based on the hotspot data 212 to reflect the societal impact arising from aircraft travel through particular volumes of the airspace 110 and generates a new set of trajectories 250, which in turn is used to generate updated hotspot data 212, and so on. Additional iterations can be performed until a termination criterion is satisfied, such as when a set of trajectories 250 is generated that results in hotspot data 212 satisfying one or more societal impact criteria, as described further below.

According to an aspect, the trajectory planning operation 204 is performed as described for the flight planning engine 124 of FIG. 1 to generate the set of trajectories 142. For example, the trajectory planning operation 204 can process the source and destination data 130 for the one or more flight requests 192 and for the predicted flight demand 262 to determine, for each requested or predicted upcoming flight during a particular time period, a lowest-cost trajectory for that flight. In a particular, non-limiting example, the trajectory planning operation 204 can use a path-finding technique, such as an A-Star or Dijkstra-type search process (as illustrative, non-limiting examples), that has been modified to take into account societal impact factors, including the presence of social impact hotspots, in conjunction with minimizing cost associated with particular flight paths.

According to an aspect, the trajectory planning operation 204 determines each new set of trajectories 250 based on the one or more individual flight requests 192, the predicted flight demand 262, and one or more other data sources 240. In the example of FIG. 2, the one or more other data sources 240 include data that can be used with the cost function 144 to calculate costs associated with particular volumes of the airspace 110, such as data associated with obstacles 241, ground risk 242, and weather 243, one or more other data sources, or a combination thereof. When the hotspot data 212 is available (e.g., after the first iteration), the presence and/or severity of societal impact hotspots can be entered into the cost function 144 when determining the cost associated with particular volumes of the airspace 110. By increasing the cost of flying through a particular volume of airspace, aircraft are less likely to be (or are prevented from being) routed though that particular volume. As a result, the updated set of trajectories 250 is likely to result in fewer societal impact hotspots (reduced hotspot prevalence), and any remaining hotspots are likely to be less severe (e.g., due to the presence of fewer aircraft) than in the preceding iteration.

The hotspot determination 210 determines the hotspot data 212 based on the predicted traffic 206 and at least partially based on local capacity criteria 208 associated with one or more portions of the particular airspace. For example, the hotspot determination 210 can compute, based on the predicted traffic 206, how many aircraft are predicted to travel through each particular volume of the airspace in each particular time period (e.g., 15 minutes, 30 minutes, an hour, or any other time interval). Based on the number of aircraft, the types of aircraft (e.g., to determine noise emission characteristics, visibility characteristics such as size, color, lighting etc.), and attenuation factors such as altitude, distance, one or more aspects, or any combination thereof, an accumulated societal impact of the aircraft in each particular volume of airspace over each particular time period is determined. The impact can be determined for land area(s) directly under the particular airspace volume and can also be determined for neighboring areas that are also affected (e.g., due to omni-directional sound propagation from the aircraft).

The hotspot determination 210 can determine, for each time period, the accumulated societal impact on each land area due to the predicted traffic 206 flying over or nearby that land area during the time period. The accumulated societal impact can be compared to a threshold (e.g., the threshold 158 of FIG. 1), and the land area can be designated as a hotspot when the accumulated societal impact exceeds the threshold. In some implementations, a separate threshold is used for each of the one or more societal factors 146, such as a first threshold for the first noise impact 148, a second threshold for the second noise impact 150, a third threshold for the first visual impact 152, etc. In such implementations, various types of hotspots can be identified based on the different societal factors 146. For example, a number of aircraft that are highly visible but relatively silent may result in a visual impact hotspot but not a noise impact hotspot, while aircraft that are relatively noisy but small and difficult to see may result in a noise impact hotspot but not a visual impact hotspot. However, both types of aircraft may contribute to determination of a privacy hotspot. In other implementations, two or more (or all) of the societal factors 146 may be combined and compared to a single threshold for determining a societal impact hotspot.

One or more of the thresholds used to determine societal impact hotspots can be based on one or more local capacity criteria 208. To illustrate, the predicted population density 260, the predicted flight demand 262, or other predictions related to the airspace 110, land use, or population changes, can be analyzed to set one or more thresholds associated with societal impact hotspots. For example, a governing body or automated process can analyze data from the demand forecast model 202 and determine that an anticipated population growth for one or more land areas indicates that introduction (or tightening) of flight restrictions (e.g., an upper limit on an amount of air traffic) for those land areas would be appropriate. Other potential local capacity criteria 208 can include alternatives such as allowing a new flight level to be used, enabling aircraft to travel at higher altitude to reduce the societal impact of such flights. Such local capacity criteria 208 can be used for setting or updating thresholds associated with societal impact hotspots in those areas.

In some implementations, the hotspot data 212 includes an indication of the land areas that are associated with a societal impact hotspot, and the trajectory planning operation 204 increases the cost for travel in the airspace above and nearby those land areas to reduce the number of flights in the vicinity of those land areas, and thus reduces the overall societal impact on those land areas. For example, the trajectory planning operation 204 may increase the costs of volumes of the airspace at low altitudes over one such land area to have higher increased cost, while volumes of the airspace at higher altitudes and greater distance from the land area can have lower increased cost, because the noise and visual impact of aircraft at higher altitudes and greater distance may be more attenuated on the population of the land area. If a hotspot persists over multiple iterations for a particular land area, the trajectory planning operation 204 can incrementally increase the cost of associated volumes of the airspace in subsequent iterations, until a sufficient amount of air traffic has been re-routed so that the land area is no longer designated a hotspot. Increasing the cost of travel over the land area may have the effect of re-routing aircraft over a neighboring land area, which can result in another hotspot at the neighboring land area. Thus, additional iterations may be performed to eliminate the new hotspot at the neighboring hand area by increasing the costs of travel over the neighboring land area, while maintaining (or increasing, if necessary) the cost of travel over the original land area to prevent reintroduction of the original hotspot.

In some implementations, the hotspot data 212 includes data indicating whether each land area is designated a hotspot but does not provide additional information regarding impact to the one or more societal factors 146 for use during trajectory planning operation 204, and therefore societal impact is only "priced in" to airspace volume costs in response to hotspots being detected. In other implementations, the hotspot data 212 includes one or more societal impact metrics associated with each land area under evaluation, in addition to an indication for each of the land areas as to whether that land area is designated a hotspot. Thus, the trajectory planning operation 204 can implement a two-tier cost factor associated with societal impact: one cost can be applied, based on the societal impact metrics associated with a land area, to flights through airspace volumes that impact that land area (e.g., increasing the cost as the societal impact increases) when the land area is not designated as a hotspot, while a second cost can be applied in addition to (or in place of) the first cost upon receiving hotspot data 212 indicating that the land area has been designated as a hotspot. The first cost operates to reduce the likelihood of hotspot formation by increasing costs as additional flights are added, and the second cost operates to force the rerouting of flights until the hotspot is removed.

In response to the hotspot determination 210 indicating that a set of trajectories 250 results in no societal impact hotspots, the trajectories corresponding to the one or more flight requests 192 are provided to the requestors, such as via the flight plans 198 of FIG. 1.

By determining the predicted population density 260 and using the population density 260 to generate the predicted flight demand 262, more accurate estimates of future air traffic can be generated as compared to conventional flight demand estimation techniques. For example, the predicted population density 260 can predict relatively short-term population changes based on the time of day or the day of the week, such as due to the influx of commuters into commercial areas during work hours and on workdays, and the return of the commuters to the surrounding neighborhoods after work hours have ended. As another example, the predicted population density 260 can predict relatively long-term population changes, such as expected population growth due to planned or ongoing housing or commercial development of land areas. Using the predicted population density 260 to generate more accurate estimates of future air traffic, enables more efficient and more accurate air traffic management.

Figure 3:
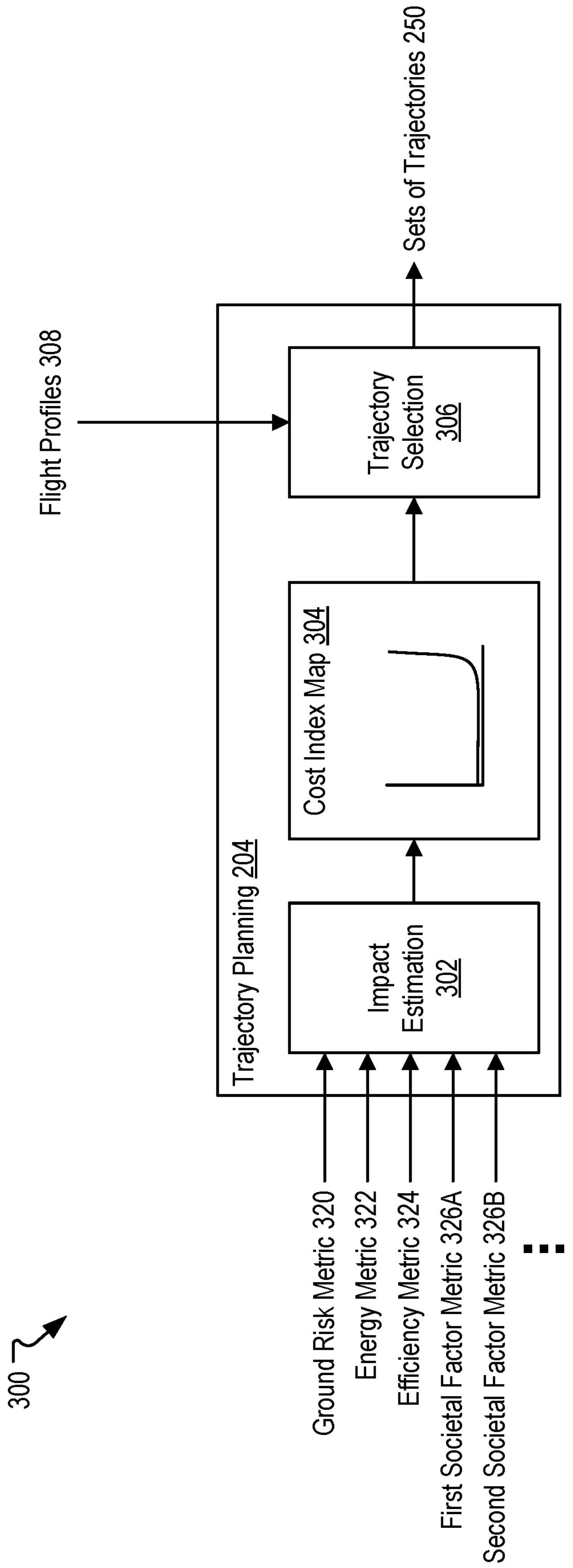
FIG. 3 is a diagram of a second particular implementation of operations performed by the system of FIG. 1.

FIG. 3 illustrates operations 300 that may be performed by the device 102 of FIG. 1 according to a particular example. The operations 300 include an impact estimation 302 and trajectory selection 306 performed as part of the trajectory planning operation 204.

The impact estimation 302 is configured to evaluate the cost function 144 to determine a cost for each volume of airspace, resulting in a cost index map 304 that indicates the cost for each of the airspace volumes. The impact estimation 302 can be based on various metrics as input to the cost function 144, including a ground risk metric 320, an energy metric 322, an efficiency metric 324, or a combination thereof. The impact estimation 302 is also based on a societal factor metric 326 associated with each of the one or more societal factors 146 that is input into the cost function 144. For example, the impact estimation 302 receives a first societal factor metric 326A associated with a first societal factor, such as the first noise impact 148, a second societal factor metric 326B associated with a second societal factor, such as the first visual impact 152, etc. According to some aspects, the societal factor metrics 326 quantify social impact by means of noise/emissions exposure levels of the aircraft or by means of annoyance indicators due to noise disturbances and privacy concerns.

The overall impact is mapped into a cost function 144 $J(\theta)$ which is a function of multiple variables (e.g., fatality risk, normalized noise exposure, etc.). The variables can correspond to the various metrics 320-326 and are included as elements of the input vector $\theta=[\theta_0, \theta_1, \ldots, \theta_n]^T$. An exemplary one-dimensional cost function 144 is depicted in the cost index map 304, showing cost (vertical axis) increasing as the underlying metric (e.g., noise exposure) increases. Because the social impact is influenced by several factors that might change over time (e.g. community noise sensitivity, familiarity with unmanned operations), an adaptive cost function 144 can be implemented in the impact estimation 302. In some implementations, the cost function 144 is adapted for specific variables or parameters via modification of the respective gradients, $$\partial J(\theta)/\partial\theta_j.$$

Once the cost is updated under consideration of the societal impact, the trajectory planning operation 204 can use the generated cost index map 304, load flight profiles 308 (e.g., the flight request 192, the predicted flight demand 262, or a combination thereof), and model the trajectories 250?. Additionally, applicable rules of the air can be taken into account in the definition of the trajectories 250, allowing management of an entire set of trajectories.

Societal impact can be quantified based on the impact of an individual flight on the population overflown by that flight, based on the cumulative impact of all aircraft traffic in a specific area, or both. For example, for noise exposure, the impact of an individual flight can be determined by finding a cumulative noise metric along its trajectory and, based on the cumulative noise metric, an annoyance level for the overflown population can be determined. In a traffic scenario in a specific area, the noise exposure can correspond to the cumulative noise exposure created in the specific area (e.g., by multiple aircraft) for a time-limited duration and for a given population that is overflown.

In a non-limiting example, a noise exposure metric $L_{den}$ can be determined based on the noise level L of aircraft to which a population is exposed, which can be determined by the characteristics of the aircraft and the aircraft trajectory (e.g., the spatial density of the overflown population and the distance from the population).

A penalty can be applied based on the time of day, such as depicted in Table 1, in which the penalty is represented as additional noise in decibels (dB) to represent additional perceived impact of aircraft noise based on the time of day.

TABLE 1

| Part of the Day | Hours | Penalty (dB) |
|---|---|---|
| Daytime | 07:00-19:00 | 0 |
| Evening | 19:00-23:00 | 5 |
| Night | 23:00-07:00 | 10 |

$L_{den}$ can be computed based on combining noise levels (with penalty) for each part of the day. As an illustrative, non-limiting example, $L_{den}$ can be computed as:

$$L_{den}=10lg[(12/24)*10^{(LD/10)}+(4/24)*10^{((LE+5)/10)}+(8/24)*10^{((LN+10)/10)}]$$

where lg[.] indicates a logarithm, "*" indicates a multiplication operation, LD indicates a daytime noise level, LE indicates an evening noise level, and LN indicates a nighttime noise level. The expression includes a sum of terms, where each term represents a corresponding portion of the day (mapped to particular times of the day based on, e.g., Table 1), adjusted to include the penalty (if any) associated with the portion of the day and scaled based on the duration of the portion of the day. According to some aspects, $L_{den}$ can be computed based on statistical average ambient noise levels, based on specific time segments that are based on the actual presence of noise-affected parties (e.g., persons in the overflown population), based on one or more other factors, or any combination thereof.

An annoyance level can be determined based on $L_{den}$. In a particular illustrative, non-limiting example, the annoyance level is determined using a lookup operation of a table or database that associates values of $L_{den}$ to a percentage of persons that are annoyed (% A) or highly annoyed (% HA) for a given population. For a single trajectory, the annoyance level can be expressed as an average percentage of persons annoyed by a single flight (e.g., based on the lookup operation) for a given population that is overflown. In some implementations, the annoyance level can be further based on an area sensitivity (e.g., some areas may include populations that, on average, are more annoyed by aircraft noise than the populations of other areas). For a traffic scenario in a specific area, the annoyance level can correspond to an average percentage of annoyed persons in the specific area (e.g., due to cumulative noise from multiple aircraft) for a time-limited duration and for a given population that is overflown.

As another example, for visual exposure, the impact of an individual flight of an aircraft along its trajectory can be determined based on a product of the population density of an area that is overflown and the duration that the aircraft is over the area. In a traffic scenario in a specific area, the visual exposure can correspond to the cumulative visual exposure in the specific area (e.g., by multiple aircraft) for a time-limited duration and for a given population that is overflown.

Social impact due to visual exposure can include a subjective measure of privacy infringement, which can be determined as an average percentage of annoyed persons due to the presence of an aircraft (e.g., for a single flight) or, in a traffic scenario, as an average percentage of annoyed persons in a specific area for a time-limited duration and for a given population that is overflown.

Impacts to wildlife can be determined in a similar manner as described above for people, based on overflown wildlife density, duration, and cumulative exposure (e.g., noise or visual exposure, or both). An annoyance of overflown wildlife can similarly be estimated for a single trajectory based on a product of the overflown wildlife density and the duration of the flight overhead, multiplied with a sensitivity score for the area and aircraft-specific performance (e.g., speed, angle, color, noise, etc.). Wildlife annoyance for a traffic scenario can be determined based on cumulative exposure in a specific area for a time-limited duration (e.g., by multiple aircraft) and for a given animal population that is overflown, and further based on (e.g., multiplied by) a sensitivity score for the specific area, and aircraft-specific performance.

Figure 4:
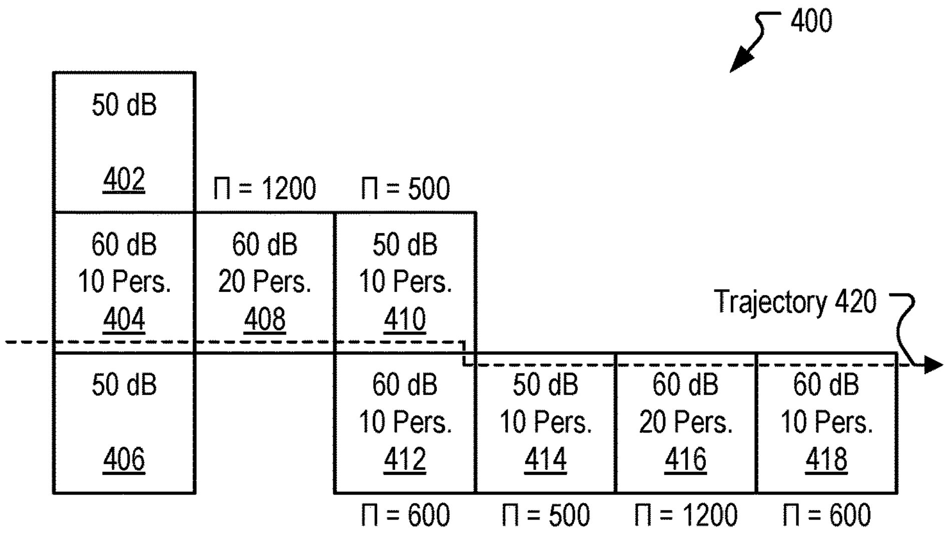
FIG. 4 is a diagram that illustrates a first example of noise impact that may be used by the system of FIG. 1 for flight planning.

FIG. 4 illustrates an example 400 showing multiple representative adjacent land areas 402-418 in the vicinity of an aircraft flight path, indicated as a trajectory 420. A normalized noise metric for each overflown land area (the land areas 404, 408, 410, 412, 414, 416, and 418) can be computed based on the noise level at the land area due to the aircraft and the population of the land area. For example, the land area 404 experiences a noise level of 60 dB and has a population of 60 persons, resulting in a product of 600 dB-persons. Likewise, the land area 408 experiences a noise level of 60 dB and has a population of 20 persons, resulting in a product of 1200 dB-persons, while the land area 410 experiences a noise level of 50 dB and has a population of 10 persons, resulting in a product of 500 dB-persons. The total noise exposure metric for the trajectory 420 can correspond to the sum over all overflown land areas, resulting in a value of 5200 dB-persons. The total population overflown is 90 persons, so the average (per-person) noise per flight of that aircraft along the trajectory 420 is 57.8 dB. The noise impact in individual land areas, the total noise impact along the trajectory 420 of 5200 dB-persons, the average noise of 57.8 dB, or any combination thereof, can be used as societal impact factors when determining a total cost associated with the trajectory 420.

Figure 5:
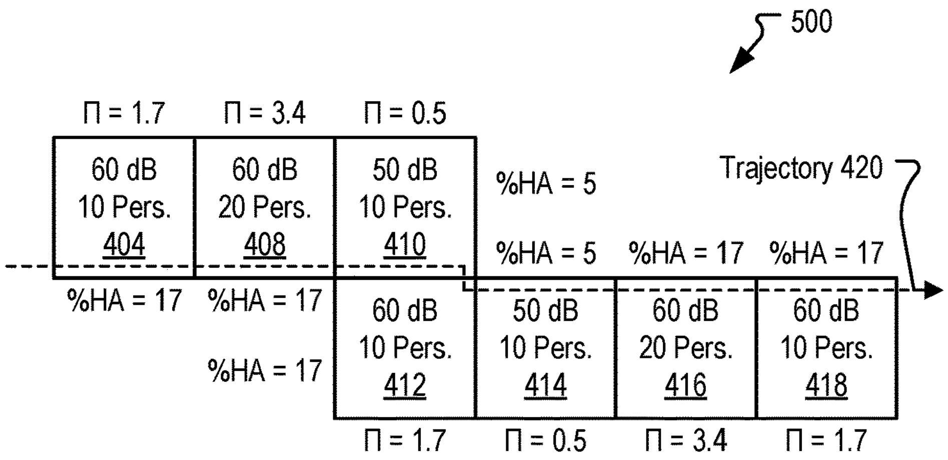
FIG. 5 is a diagram that illustrates a second example of noise impact that may be used by the system of FIG. 1 for flight planning.

FIG. 5 illustrates an example 500 showing the trajectory 420 and the overflown adjacent land areas 404, 408, 410, 412, 414, 416, and 418 of FIG. 4. An annoyance factor per land area can be determined based on a table 550. The table 550 provides an illustrative, non-limiting example that associates a measure of noise level ($L_{den}$) with the percentages of annoyed and highly annoyed people in the overflown population. As illustrated, the land area 404 has a 60 dB noise level, indicated by the table 550 as corresponding to a 17% highly annoyed population. The number of highly annoyed people (π) in the land area 404 is determined as 17% of 10 persons, or π=1.7. The land area 408 also has a 60 dB noise level for a population of 20 persons, resulting π=3.4. The land area 410 has a 50 dB noise level corresponding to a % HA=5% in the table 550, which results in π=0.5 for a population of 10 persons. The total noise annoyance metric for the trajectory 420 can correspond to the sum of highly annoyed persons in the overflown land areas, resulting in a value of 12.9. The total population overflown is 90 persons, so the average proportion of highly annoyed persons along the trajectory 420 is 14%. The number of highly annoyed people (π) in individual land areas, the total number of highly annoyed people along the trajectory 420, the average percentage of highly annoyed people along the trajectory 420, or any combination thereof, can be used as societal impact factors when determining a total cost associated with the trajectory 420.

It should be understood that simplified examples have been provided for purpose of explanation and that, in other implementations, other measurements and calculations can be used to determine societal factor impacts in place of, or in addition to, the above-described examples. For example, the noise annoyance determination described in FIG. 5 can also take into account the portion of the overflown population that is annoyed (% A) in addition to the portion that is highly annoyed (% HA), the effect on populations that are in land areas that are adjacent to overflown land areas (e.g., people in the land area 402 may also be affected by noise from an aircraft flying over the land area 404, and may contribute to the total social impact cost of the trajectory 420, etc.

Figure 6:
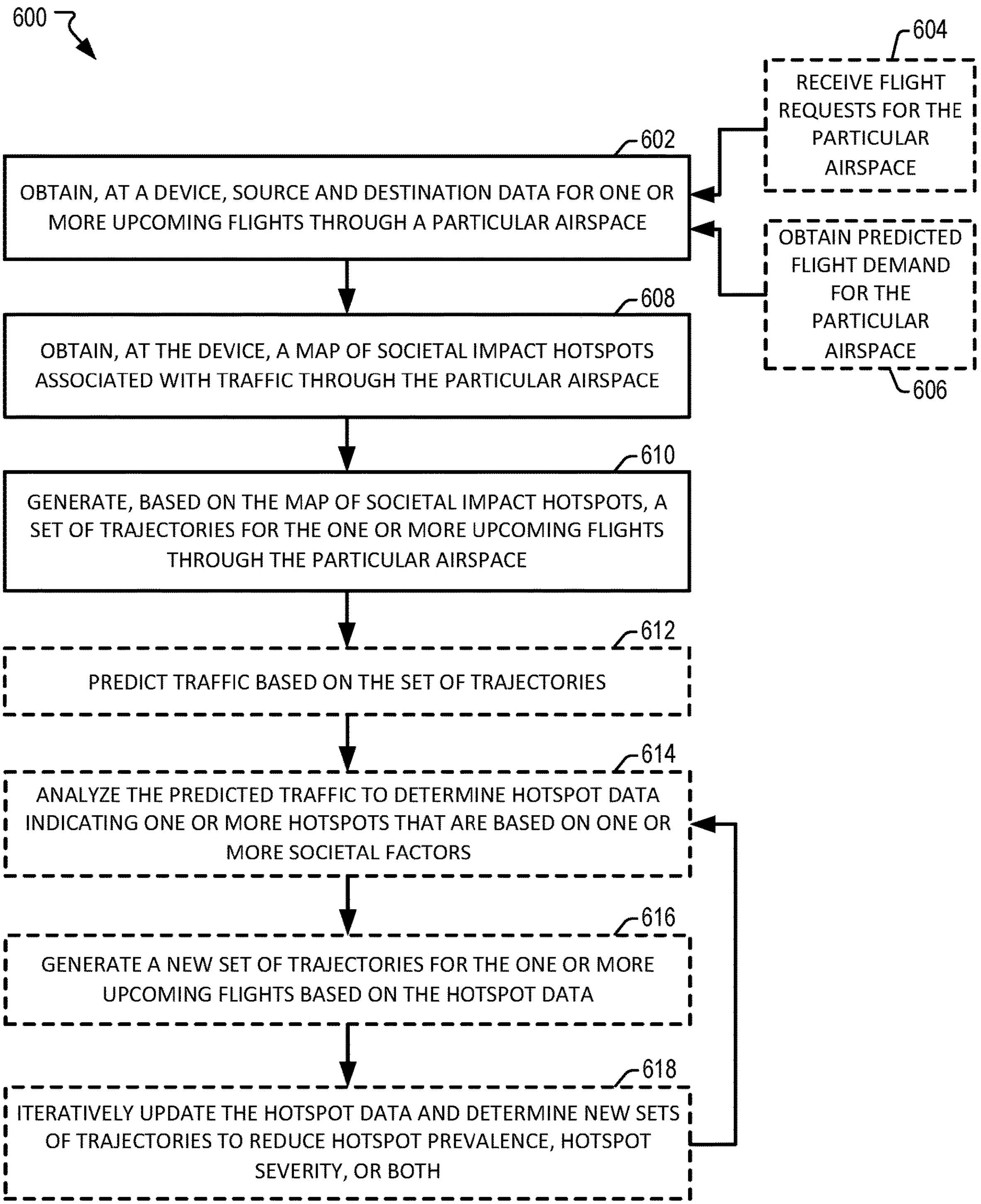
FIG. 6 is a flowchart illustrating a method of performing flight planning based on societal impact considerations.

FIG. 6 is a flowchart illustrating a method 600 of flight planning based on social impact considerations. In a particular implementation, the method 600 is performed by the flight data generator 122, the flight planning engine 124, the societal impact hotspot predictor 126, the trajectory generator 128, the one or more processors 120, the device 102, or the system 100 of FIG. 1.

In some implementations, the method 600 includes, at block 602, obtaining, at a device, source and destination data for one or more upcoming flights through a particular airspace. For example, the device 102 obtains the source and destination data 130 for one or more upcoming flights 132 through the airspace 110.

For example, in some implementations, the method 600 includes, at block 604, receiving flight requests for the particular airspace. To illustrate, the device 102 receives the flight requests 192, and the source and destination data 130 is at least partially based on the flight requests 192.

As another example, in some implementations, the method 600 includes, at block 606 obtaining predicted flight demand for the particular airspace. To illustrate, the device 102 obtains the predicted flight demand 262, and the source and destination data 130 is at least partially based on the predicted flight demand 262. According to a particular aspect, the predicted flight demand is generated based on a predicted population density, such as the predicted population density 260.

The method 600 includes, at block 608, obtaining, at the device, a map of societal impact hotspots associated with traffic through the particular airspace. For example, the device 102 obtains the map of societal impact hotspots 140, which may correspond to the hotspot data 212 generated by the hotspot determination 210 of FIG. 2.

The method 600 includes, at block 610, generating, based on the map of societal impact hotspots, a set of trajectories for the one or more upcoming flights through the particular airspace. For example, the set of trajectories 142 is generated for the one or more upcoming flights 132 based on the map of societal impact hotspots 140.

In some implementations, the set of trajectories (142) is further based on a cost function, such as described with reference to the cost function 144. According to an aspect, the cost function is at least partially based on one or more societal factors, such as the one or more societal factors 146. To illustrate, the one or more societal factors can include at least one of: a first noise impact (e.g., the first noise impact 148) on an overflown human population, a first visual impact (e.g., the first visual impact 152) on the overflown human population, a second noise impact (e.g., the second noise impact 150) on an overflown wildlife population, a second visual impact (e.g., the second visual impact 154) on the overflown wildlife population, or a privacy impact (e.g., the privacy impact 156). In some examples, a metric associated with each of the one or more societal factors is input into the cost function, such as the societal factor metric(s) 326. One or more aspects of the cost function associated with a visual impact, a noise impact, or both, can be at least partially determined based on a time of day associated with at least one of the upcoming flights. According to some aspects, each of the societal impact hotspots is indicative of a total impact from one or more of the societal factors in a corresponding portion of the particular airspace exceeding a threshold (e.g., the threshold 158), and a presence of each of the societal impact hotspots is input into the cost function.

In some implementations, the cost function is further based on a risk metric, an energy metric, an efficiency metric, or a combination thereof. For example, the cost function 144 used by the impact estimation 302 is based on one or more of the ground risk metric 320, the energy metric 322, or the efficiency metric 324, in addition to one or more of the societal factor metrics 326.

In some implementations, the method 600 includes, at block 612, predicting traffic based on the set of trajectories and, at block 614, analyzing the predicted traffic to determine hotspot data indicating one or more hotspots that are based on one or more societal factors, such as the hotspot data 212 that is based on analyzing the predicted traffic 206. According to some aspects, the hotspot data is at least partially based on capacity criteria associated with one or more portions of the particular airspace, such as the local capacity criteria 208. The method 600 can also include, at block 616, generating a new set of trajectories (e.g., a new one of the sets of trajectories 250) for the one or more upcoming flights based on the hotspot data.

In some implementations, the method 600 includes, at block 618, iteratively updating the hotspot data and determining new sets of trajectories to reduce hotspot prevalence, hotspot severity, or both, such as described with reference to the iterative processing of the trajectory planning operation 204 and the hotspot determination 210 of FIG. 2.

Figure 7:
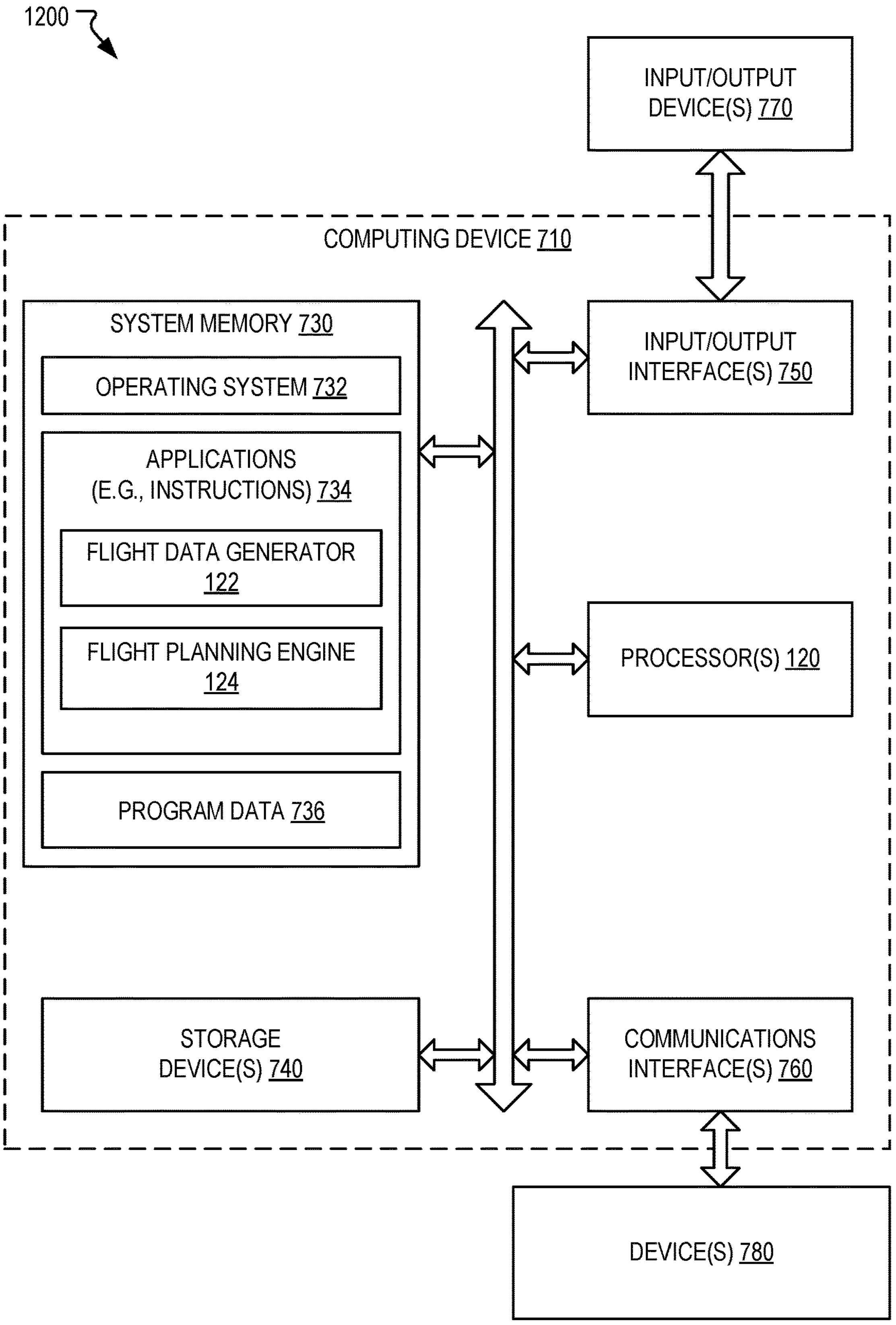
FIG. 7 is a block diagram of a computing environment including a computing device configured to support aspects of computer-implemented methods and computer-executable program instructions (or code) according to the present disclosure.

FIG. 7 is a block diagram of a computing environment 700 including a computing device 710 configured to support aspects of computer-implemented methods and computer-executable program instructions (or code) according to the present disclosure. For example, the computing device 710, or portions thereof, is configured to execute instructions to initiate, perform, or control one or more operations described with reference to FIGS. 1-6.

The computing device 710 includes the one or more processors 120. The one or more processors 120 are configured to communicate with system memory 730, one or more storage devices 740, one or more input/output interfaces 750, one or more communications interfaces 760, or any combination thereof. The system memory 730 includes volatile memory devices (e.g., random access memory (RAM) devices), nonvolatile memory devices (e.g., read-only memory (ROM) devices, programmable read-only memory, and flash memory), or both. The system memory 730 stores an operating system 732, which may include a basic input/output system for booting the computing device 710 as well as a full operating system to enable the computing device 710 to interact with users, other programs, and other devices. The system memory 730 stores system (program) data 736, such as the source and destination data 130, the map of hotspots 140, the set of trajectories 142, the threshold 158, other data, or a combination thereof.

The system memory 730 includes one or more applications 734 (e.g., sets of instructions) executable by the one or more processors 120. As an example, the one or more applications 734 include instructions executable by the one or more processors 120 to initiate, control, or perform one or more operations described with reference to FIGS. 1-7. To illustrate, the one or more applications 734 include instructions executable by the one or more processors 120 to initiate, control, or perform one or more operations described with reference to the flight data generator 122, the flight planning engine 124, the societal impact hotspot predictor 126, the trajectory generator 128, the demand forecast model 202, the trajectory planning operation 204, the hotspot determination 210, or a combination thereof.

In a particular implementation, the system memory 730 includes a non-transitory, computer readable medium storing the instructions that, when executed by the one or more processors 120, cause the one or more processors 120 to initiate, perform, or control operations to perform flight planning based on societal impact considerations. The operations include obtaining source and destination data (e.g., the source and destination data 130) for one or more upcoming flights (e.g., the upcoming flights 132) through a particular airspace (e.g., the airspace 110); obtaining a map of societal impact hotspots (e.g., the map of hotspots 140) associated with traffic through the particular airspace; and generating, based on the map of societal impact hotspots, a set of trajectories (e.g., the set of trajectories 142) for the one or more upcoming flights through the particular airspace.

The one or more storage devices 740 include nonvolatile storage devices, such as magnetic disks, optical disks, or flash memory devices. In a particular example, the storage devices 740 include both removable and non-removable memory devices. The storage devices 740 are configured to store an operating system, images of operating systems, applications (e.g., one or more of the applications 734), and program data (e.g., the program data 736). In a particular aspect, the system memory 730, the storage devices 740, or both, include tangible computer-readable media. In a particular aspect, one or more of the storage devices 740 are external to the computing device 710.

The one or more input/output interfaces 750 enable the computing device 710 to communicate with one or more input/output devices 770 to facilitate user interaction. For example, the one or more input/output interfaces 750 can include a display interface, an input interface, or both. For example, the input/output interface 750 is adapted to receive input from a user, to receive input from another computing device, or a combination thereof. In some implementations, the input/output interface 750 conforms to one or more standard interface protocols, including serial interfaces (e.g., universal serial bus (USB) interfaces or Institute of Electrical and Electronics Engineers (IEEE) interface standards), parallel interfaces, display adapters, audio adapters, or custom interfaces ("IEEE" is a registered trademark of The Institute of Electrical and Electronics Engineers, Inc. of Piscataway, New Jersey). In some implementations, the input/output device 770 includes one or more user interface devices and displays, including some combination of buttons, keyboards, pointing devices, displays, speakers, microphones, touch screens, and other devices. In a particular example, the input/output device 770 corresponds to the output device 196 and includes a display configured to display the one or more flight plans 198 to an operator of the device 102 of FIG. 1.

The one or more processors 120 are configured to communicate with one or more devices 780 via the one or more communications interfaces 760. For example, the one or more communications interfaces 760 can include a network interface. The one or more devices 780 can include, for example, one or more transmitters, one or more receivers, one or more other devices, or any combination thereof. In a particular example, the one or more devices 780 correspond to the fleet operator system 190, the one or more user devices 194, or a combination thereof.

In conjunction with the described systems and methods, an apparatus for performing flight planning based on societal impact considerations is disclosed that includes means for obtaining, at a device, source and destination data for one or more upcoming flights through a particular airspace. In some implementations, the means for obtaining the source and destination data corresponds to the device 102, the one or more processors 120, the flight data generator 122, the flight planning engine 124, the computing device 710, the input/output interface 750, the one or more communication interfaces 760, one or more other circuits or devices configured to obtain the source and destination data for one or more upcoming flights through a particular airspace, or a combination thereof.

The apparatus also includes means for obtaining, at the device, a map of societal impact hotspots associated with traffic through the particular airspace. In some implementations, the means for obtaining a map of societal impact hotspots associated with traffic through the particular airspace corresponds to the device 102, the one or more processors 120, the flight planning engine 124, the societal impact hotspot predictor 126, the computing device 710, one or more other circuits or devices configured to obtain a map of societal impact hotspots associated with traffic through the particular airspace, or a combination thereof.

The apparatus also includes means for generating, based on the map of societal impact hotspots, a set of trajectories for the one or more upcoming flights through the particular airspace. In some implementations, the means for generating, based on the map of societal impact hotspots, a set of trajectories for the one or more upcoming flights through the particular airspace corresponds to the device 102, the one or more processors 120, the flight planning engine 124, the trajectory generator 128, the computing device 710, one or more other circuits or devices configured to generate, based on the map of societal impact hotspots, a set of trajectories for the one or more upcoming flights through the particular airspace, or a combination thereof.

In some implementations, a non-transitory, computer readable medium stores instructions that, when executed by one or more processors, cause the one or more processors to initiate, perform, or control operations to perform part or all of the functionality described above. For example, the instructions may be executable to implement one or more of the operations or methods of FIGS. 1-7. In some implementations, part or all of one or more of the operations or methods of FIGS. 1-7 may be implemented by one or more processors (e.g., one or more central processing units (CPUs), one or more graphics processing units (GPUs), one or more neural processing units (NPUs), one or more digital signal processors (DSPs)) executing instructions, by dedicated hardware circuitry, or any combination thereof.

Particular aspects of the disclosure are described below in sets of interrelated Examples:

According to Example 1, a method includes: obtaining, at a device, source and destination data for one or more upcoming flights through a particular airspace; obtaining, at the device, a map of societal impact hotspots associated with traffic through the particular airspace; and generating, based on the map of societal impact hotspots, a set of trajectories for the one or more upcoming flights through the particular airspace.

Example 2 includes the method of Example 1, wherein the set of trajectories is further based on a cost function.

Example 3 includes the method of Example 2, wherein the cost function is at least partially based on one or more societal factors.

Example 4 includes the method of Example 3, wherein the one or more societal factors include at least one of: a first noise impact on an overflown human population; a first visual impact on the overflown human population; a second noise impact on an overflown wildlife population; a second visual impact on the overflown wildlife population; or a privacy impact.

Example 5 includes the method of Example 3 or 4, wherein a metric associated with each of the one or more societal factors is input into the cost function.

Example 6 includes the method of any of Example 3 to 5, wherein each of the societal impact hotspots is indicative of a total impact from one or more of the societal factors in a corresponding portion of the particular airspace exceeding a threshold, and wherein a presence of each of the societal impact hotspots is input into the cost function.

Example 7 includes the method of any of Example 2 to 6, wherein the cost function is further based on a risk metric, an energy metric, an efficiency metric, or a combination thereof.

Example 8 includes the method of any of Example 2 to 7, wherein one or more aspects of the cost function associated with a visual impact, a noise impact, or both, are at least partially determined based on a time of day associated with at least one of the upcoming flights.

Example 9 includes the method of any of Example 1 to 8, further comprising: predicting traffic based on the set of trajectories; analyzing the predicted traffic to determine hotspot data indicating one or more hotspots that are based on one or more societal factors; and generating a new set of trajectories for the one or more upcoming flights based on the hotspot data.

Example 10 includes the method of Example 9, wherein determination of the hotspot data is at least partially based on capacity criteria associated with one or more portions of the particular airspace.

Example 11 includes the method of Example 9 or 10, further comprising iteratively updating the hotspot data and determining new sets of trajectories to reduce hotspot prevalence, hotspot severity, or both.

Example 12 includes the method of any of Example 1 to 11, further comprising receiving flight requests for the particular airspace, wherein the source and destination data is at least partially based on the flight requests.

Example 13 includes the method of any of Example 1 to 12, further comprising obtaining predicted flight demand for the particular airspace, wherein the source and destination data is at least partially based on the predicted flight demand.

Example 14 includes the method of Example 13, wherein the predicted flight demand is generated based on a predicted population density.

According to Example 15, a device includes: a memory configured to store instructions; and a processor configured to execute the instructions to perform the method of any of Example 1 to 14.

According to Example 16, a non-transitory computer-readable medium stores instructions that, when executed by a processor, cause the processor to perform the method of any of Example 1 to 14.

According to Example 17, an apparatus includes means for carrying out the method of any of Example 1 to 14.

According to Example 18, a non-transitory storage medium includes instructions that, when executed by one or more processors, cause the one or more processors to: obtain source and destination data for one or more upcoming flights through a particular airspace; obtain a map of societal impact hotspots associated with traffic through the particular airspace; and generate, based on the map of societal impact hotspots, a set of trajectories for the one or more upcoming flights through the particular airspace.

Example 19 includes the non-transitory storage medium of Example 18, wherein the set of trajectories is generated further based on a cost function that is at least partially based on one or more societal factors.

Example 20 includes the non-transitory storage medium of Example 18 or 19, wherein the instructions, when executed by the one or more processors, further cause the one or more processors to: predict traffic based on the set of trajectories; analyze the predicted traffic to determine hotspot data indicating one or more hotspots that are based on one or more societal factors; and generate a new set of trajectories for the one or more upcoming flights based on the hotspot data.

According to Example 21, a device includes: one or more processors configured to: obtain source and destination data for one or more upcoming flights through a particular airspace; obtain a map of societal impact hotspots associated with traffic through the particular airspace; and generate, based on the map of societal impact hotspots, a set of trajectories for the one or more upcoming flights through the particular airspace.

Example 22 includes the device of Example 21, wherein the source and destination data for the one or more upcoming flights is obtained via flight requests for the particular airspace, predicted flight demand for the particular airspace, or a combination thereof.

Example 23 includes the device of Example 21 or 22, wherein the one or more processors are configured to iteratively update hotspot data and determine new sets of trajectories to reduce a prevalence, a severity, or both, of the societal impact hotspots.

The illustrations of the examples described herein are intended to provide a general understanding of the structure of the various implementations. The illustrations are not intended to serve as a complete description of all of the elements and features of apparatus and systems that utilize the structures or methods described herein. Many other implementations may be apparent to those of skill in the art upon reviewing the disclosure. Other implementations may be utilized and derived from the disclosure, such that structural and logical substitutions and changes may be made without departing from the scope of the disclosure. For example, method operations may be performed in a different order than shown in the figures or one or more method operations may be omitted. Accordingly, the disclosure and the figures are to be regarded as illustrative rather than restrictive.

Moreover, although specific examples have been illustrated and described herein, it should be appreciated that any subsequent arrangement designed to achieve the same or similar results may be substituted for the specific implementations shown. This disclosure is intended to cover any and all subsequent adaptations or variations of various implementations. Combinations of the above implementations, and other implementations not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single implementation for the purpose of streamlining the disclosure. Examples described above illustrate but do not limit the disclosure. It should also be understood that numerous modifications and variations are possible in accordance with the principles of the present disclosure. As the following claims reflect, the claimed subject matter may be directed to less than all of the features of any of the disclosed examples. Accordingly, the scope of the disclosure is defined by the following claims and their equivalents.

What is claimed is:

1. A method comprising:

obtaining, at a device, source and destination data for one or more upcoming flights through a particular airspace;

obtaining, at the device, a map of societal impact hotspots associated with traffic through the particular airspace;

generating, based on the map of societal impact hotspots and a cost function, a set of trajectories for the one or more upcoming flights through the particular airspace, wherein a first particular trajectory through a first airspace associated with a first region categorized for a first use has a first cost, and wherein a second particular trajectory through a second airspace associated with a second region categorized for a second use has a second cost distinct from the first cost;

performing an iterative optimization process comprising:

analyzing predicted traffic based on the set of trajectories to determine predicted cumulative societal impacts across multiple aircraft;

updating the cost function based on the predicted cumulative societal impacts, wherein the updating comprises modifying cost values for specific airspace volumes responsive to predicted hotspot formation from multiple concurrent flights; and generating new sets of trajectories using the updated cost function until a convergence criterion is satisfied, wherein the convergence criterion comprises particular predicted cumulative societal impacts corresponding to the new sets of trajectories falling below predetermined impact thresholds for all regions; and generating an updated map of societal impact hotspots based on the new sets of trajectories and the map of societal impact hotspots, wherein a hotspot is identified on the updated map of societal impact hotspots responsive to a particular societal impact for a particular airspace satisfying a corresponding threshold, and wherein the corresponding threshold is determined based on a particular use associated with a particular region associated with the particular airspace and a schedule identifying a plurality of particular events associated with the particular region.

2. The method of claim 1, further comprising providing a flight plan to a first user device associated with a first upcoming flight of the one or more upcoming flights, wherein the flight plan is based on a first trajectory of the set of trajectories, and wherein the flight plan indicates a particular trajectory for the first user device to follow.

3. The method of claim 1, wherein the cost function is at least partially based on one or more societal factors.

4. The method of claim 3, wherein the one or more societal factors include at least one of:

a first noise impact on an overflown human population;

a first visual impact on the overflown human population;

a second noise impact on an overflown wildlife population;

a second visual impact on the overflown wildlife population; or a privacy impact.

5. The method of claim 3, wherein a metric associated with each of the one or more societal factors is input into the cost function.

6. The method of claim 3, wherein each of the societal impact hotspots is indicative of a total impact from one or more of the societal factors in a corresponding portion of the particular airspace exceeding a threshold, and wherein the iterative optimization process incorporates a presence of each of the societal impact hotspots into the updated cost function.

7. The method of claim 1, wherein the iterative optimization process implements cost coupling, wherein a first trajectory generated for the set of trajectories changes costs of the cost function for a second trajectory generated for the set of trajectories within the same optimization iteration.

8. The method of claim 1, wherein the particular events include a religious observance, a holiday, or both.

9. The method of claim 1, wherein the iterative optimization process further comprises:

predicting cumulative traffic impact by modeling interactions between multiple concurrent flight trajectories; and analyzing the predicted cumulative traffic impact to identify potential hotspot formation before actual flight execution, wherein the updating of the cost function comprises applying progressive cost penalties to airspace volumes based on predicted hotspot severity levels, wherein higher predicted impact results in exponentially increased cost penalties.

10. The method of claim 9, wherein the analyzing predicted traffic to determine hotspot data includes modeling cumulative multi-aircraft interactions and is at least partially based on capacity criteria associated with one or more portions of the particular airspace.

11. The method of claim 9, wherein the convergence criterion comprises achieving a trajectory distribution where predicted societal impact remains below predetermined capacity thresholds for a specified time duration, and wherein the optimization process terminates when consecutive iterations produce trajectory sets with less than a predetermined percentage change in cumulative societal impact.

12. The method of claim 1, further comprising receiving flight requests for the particular airspace, wherein the source and destination data is at least partially based on the flight requests.

13. The method of claim 1, further comprising obtaining predicted flight demand for the particular airspace, wherein the source and destination data is at least partially based on the predicted flight demand.

14. The method of claim 13, wherein the predicted flight demand is generated based on a predicted population density.

15. A non-transitory computer-readable medium comprising instructions that, when executed by one or more processors, cause the one or more processors to:

obtain source and destination data for one or more upcoming flights through a particular airspace;

obtain a map of societal impact hotspots associated with traffic through the particular airspace;

generate, based on the map of societal impact hotspots and a cost function, a set of trajectories for the one or more upcoming flights through the particular airspace, wherein a first particular trajectory through a first airspace associated with a first region categorized for a first use has a first cost, and wherein a second particular trajectory through a second airspace associated with a second region categorized for a second use has a second cost distinct from the first cost;

perform an iterative optimization process comprising:

analyze predicted traffic based on the set of trajectories to determine predicted cumulative societal impacts across multiple aircraft;

update the cost function based on the predicted cumulative societal impacts, wherein the updating comprises modifying cost values for specific airspace volumes responsive to predicted hotspot formation from multiple concurrent flights; and generate new sets of trajectories using the updated cost function until a convergence criterion is satisfied, wherein the convergence criterion comprises particular predicted cumulative societal impacts corresponding to the new sets of trajectories falling below predetermined impact thresholds for all regions; and generate an updated map of societal impact hotspots based on the new sets of trajectories and the map of societal impact hotspots, wherein a hotspot is identified on the updated map of societal impact hotspots responsive to a particular societal impact for a particular airspace satisfying a corresponding threshold, and wherein the corresponding threshold is determined based on a particular use associated with a particular region associated with the particular airspace and a schedule identifying a plurality of particular events associated with the particular region.

16. The non-transitory computer-readable medium of claim 15, wherein the cost function is at least partially based on one or more societal factors.

17. The non-transitory computer-readable medium of claim 15, wherein the instructions, when executed by the one or more processors, further cause the one or more processors to:

predict cumulative traffic impact by modeling interactions between multiple concurrent flight trajectories; and analyze the predicted cumulative traffic impact to identify potential hotspot formation before actual flight execution, wherein the updating of the cost function comprises applying progressive cost penalties to airspace volumes based on predicted hotspot severity levels, wherein higher predicted impact results in exponentially increased cost penalties.

18. A device comprising:

one or more processors configured to:

obtain source and destination data for one or more upcoming flights through a particular airspace;

obtain a map of societal impact hotspots associated with traffic through the particular airspace;

generate, based on the map of societal impact hotspots and a cost function, a set of trajectories for the one or more upcoming flights through the particular airspace, wherein a first particular trajectory through a first airspace associated with a first region categorized for a first use has a first cost, and wherein a second particular trajectory through a second airspace associated with a second region categorized for a second use has a second cost distinct from the first cost;

perform an iterative optimization process comprising:

analyze predicted traffic based on the set of trajectories to determine predicted cumulative societal impacts across multiple aircraft;

update the cost function based on the predicted cumulative societal impacts, wherein the updating comprises modifying cost values for specific airspace volumes responsive to predicted hotspot formation from multiple concurrent flights; and generate new sets of trajectories using the updated cost function until a convergence criterion is satisfied, wherein the convergence criterion comprises particular predicted cumulative societal impacts corresponding to the new sets of trajectories falling below predetermined impact thresholds for all regions; and generate an updated map of societal impact hotspots based on the new sets of trajectories and the map of societal impact hotspots, wherein a hotspot is identified on the updated map of societal impact hotspots responsive to a particular societal impact for a particular airspace satisfying a corresponding threshold, and wherein the corresponding threshold is determined based on a particular use associated with a particular region associated with the particular airspace and a schedule identifying a plurality of particular events associated with the particular region.

19. The device of claim 18, wherein the source and destination data for the one or more upcoming flights is obtained via flight requests for the particular airspace, predicted flight demand for the particular airspace, or a combination thereof.

20. The device of claim 18, wherein the convergence criterion comprises achieving a trajectory distribution where predicted cumulative societal impact remains below predetermined capacity thresholds for a specified time duration, and wherein the iterative optimization process terminates when consecutive iterations produce trajectory sets with less than a predetermined percentage change in cumulative societal impact.

* * * * *